US011242431B2

(12) United States Patent
Valeri et al.

(10) Patent No.: US 11,242,431 B2
(45) Date of Patent: Feb. 8, 2022

(54) HEAT-CURABLE HYBRID EPOXY FUNCTIONAL COMPOSITION AND TRANSPARENT HEAT-CURED CAUSTIC-RESISTANT COATINGS PREPARED THEREFROM

(71) Applicant: Essilor International, Charenton-le-Pont (FR)

(72) Inventors: Robert Valeri, Dallas, TX (US); Haipeng Zheng, Carrollton, TX (US); Matthew Freeman, Spring, TX (US)

(73) Assignee: Essilor International, Charenton-le-Pont (FR)

( * ) Notice: Subject to any disclaimer, the term of this patent is extended or adjusted under 35 U.S.C. 154(b) by 128 days.

(21) Appl. No.: 16/463,268

(22) PCT Filed: Oct. 25, 2017

(86) PCT No.: PCT/EP2017/077267
§ 371 (c)(1),
(2) Date: May 22, 2019

(87) PCT Pub. No.: WO2018/095680
PCT Pub. Date: May 31, 2018

(65) Prior Publication Data
US 2019/0345286 A1    Nov. 14, 2019

(30) Foreign Application Priority Data

Nov. 23, 2016  (EP) .................................... 16306548

(51) Int. Cl.
*C08G 59/22* (2006.01)
*C08G 59/36* (2006.01)
*C08G 59/40* (2006.01)
*C08L 63/00* (2006.01)
*C09D 163/00* (2006.01)
*G02B 1/04* (2006.01)

(52) U.S. Cl.
CPC ........... *C08G 59/223* (2013.01); *C08G 59/36* (2013.01); *C08G 59/4085* (2013.01); *C08L 63/00* (2013.01); *C09D 163/00* (2013.01); *G02B 1/041* (2013.01)

(58) Field of Classification Search
CPC ...... C08G 59/223; C08G 59/36; C08G 59/38; C09D 163/00–10; G02B 1/10–111
See application file for complete search history.

(56) References Cited

U.S. PATENT DOCUMENTS

| 4,141,872 | A | * | 2/1979 | Bunkowski | ............ | C08G 12/32 428/530 |
| 4,895,767 | A | * | 1/1990 | Mori | ...................... | G02B 1/105 428/447 |
| 4,900,848 | A | * | 2/1990 | Saito | ................... | C08G 59/3227 428/413 |
| 6,268,055 | B1 | | 7/2001 | Walters et al. | | |
| 8,360,574 | B2 | | 1/2013 | Ishak et al. | | |
| 8,846,827 | B2 | | 9/2014 | Mowrer | | |
| 2010/0304150 | A1 | * | 12/2010 | Zheng | ................... | C09D 183/06 428/414 |
| 2011/0058142 | A1 | | 3/2011 | Berit-Debat et al. | | |
| 2014/0147395 | A1 | * | 5/2014 | Rieth | ...................... | A61K 8/498 424/49 |
| 2015/0008370 | A1 | | 1/2015 | Mowrer | | |

FOREIGN PATENT DOCUMENTS

| CN | 102459483 | 5/2012 |
| WO | WO 2007/146933 | 12/2007 |
| WO | WO 2010/136484 | 12/2010 |
| WO | WO 2011/075128 | 6/2011 |
| WO | WO 2013/013929 | 1/2013 |
| WO | WO 2015/097186 | 7/2015 |
| WO | WO 2015/097492 | 7/2015 |
| WO | WO 2015/129563 | 9/2015 |

OTHER PUBLICATIONS

Brusciotti et al., "Hybrid epoxy-silane coatings for improved corrosion protection of Mg alloy" Corrosion Science, 2013, 37:82-90.
Database WPI Week 201561, Thomas Scientific, London, GB, Sep. 2, 2015.
International Search Report and Written Opinion issued in Corresponding International Patent Application No. PCT/EP2017/077267, dated Jan. 15, 2018.
Office Action Issued in Corresponding Chinese Patent Application No. 201780069282.2, dated Oct. 9, 2020.

* cited by examiner

Primary Examiner — Kregg T Brooks
(74) Attorney, Agent, or Firm — Norton Rose Fulbright US LLP

(57) ABSTRACT

The present invention relates to a heat-curable composition comprising at least one epoxy monomer comprising two or three epoxy groups, which is not a hydrolysis-polymerizable silicon compound, at least one epoxy compound bearing at least one silicon atom having at least one hydrolyzable group directly linked to the silicon atom and at least one epoxy group, and at least one epoxy ring-opening catalyst. The composition comprises at least 50% by weight of compounds having at least one epoxy group, relative to the total weight of polymerizable compounds present in the composition and provides upon pre-curing a tack-free coating that can be removed by treatment with a solution of sodium hydroxide, and upon post-curing a coating that cannot be removed by treatment with a solution of sodium hydroxide.

17 Claims, No Drawings

HEAT-CURABLE HYBRID EPOXY FUNCTIONAL COMPOSITION AND TRANSPARENT HEAT-CURED CAUSTIC-RESISTANT COATINGS PREPARED THEREFROM

The present invention relates to heat-curable epoxy functional compositions, to caustic-resistant epoxy-based coatings obtained therefrom, and to optical articles, in particular ophthalmic lenses, containing such coatings.

In the optics field, it is usual to coat articles with coatings so as to impart to the articles various mechanical and/or optical properties. Thus, classically, coatings such as impact-resistant, anti-abrasion/scratch-resistant and/or antireflection coatings are successively formed onto an ophthalmic lens.

It is not uncommon to find that a coating that is applied to an optical article fails to pass product requirements or does not meet commercially acceptable cosmetic standards. When this occurs, it is economically desirable to have the ability to remove (strip) the defective coating after an initial pre-curing step for re-processing, for example by means of a chemical treatment using heated alkaline solutions (such as aqueous or alcoholic 5-10% wt. NaOH solutions at 50-70° C.), and thereafter to apply a new coating that will be completely caustic resistant (non-strippable) after final curing. In the process of chemically removing the defective coating, the underlying coatings and the substrate should, of course, not be damaged.

Coating obtained from compositions containing exclusively epoxy compounds that are not hydrolysis-polymerizable silicon compounds are very difficult if not impossible to remove from optical articles after a pre-curing step at limited temperature lower than 90° C. Such coatings are disclosed for example in the application WO 2011/075128, in the name of the applicant. They are non-strippable in a 10% wt. NaOH solution at 50-70° C. after a pre-curing process in the curing temperature range of 60-90° C. for 10-30 minutes, and non-strippable after a post-curing process in the curing temperature range of 90-125° C. for 0.5-3 h.

The application US 2015/008370 discloses hybrid epoxy-polysiloxane based coating and flooring compositions exhibiting improved flexibility, and excellent weatherability and corrosion resistance after curing. They are prepared by combining a polysiloxane, an epoxide resin material and a curing system. However, such systems do not fit the removability needs mentioned previously.

In view of the foregoing, there is a need for a coating composition that is stable for several weeks in at least one or more of the following conditions:
when stored at low temperatures (such as −18° C. (in freezer) or a specific temperature such or 4° C. (in fridge),
when stored in a temperature range 5-10° C. such as a temperature-controlled coating tank,
when stored at ambient temperature,
and that can be conveniently applied by dip coating or spin coating and that provides, once pre-cured at reduced temperature, a tack free coating that is removable and/or strippable in a liquid medium.

The final cured coating should be resistant to a chemical treatment with an alkaline solution (non-removable), as such treatment is usually performed to clean the coating surface onto which a subsequent coating will be applied, transparent, compatible with and adhering to additional layers such as polysiloxane abrasion- and/or scratch-resistant layers or latex primer layers coated thereon.

The process for manufacturing such an article should be simple, easy to implement, reproducible and involve an optimized curing sequence.

It has been surprisingly found that it was possible to obtain a coating composition having the ability to provide a coating that is removable by treatment with a 10% wt. solution of sodium hydroxide after pre-cure to a tack-free state, but not removable by the same treatment after post-cure (final cure) by incorporating epoxysilanes into said coating composition. This modification also improved abrasion-resistance of the coating.

To address the needs of the present invention and to remedy to the mentioned drawbacks of the prior art, the applicant provides a heat-curable composition comprising:

(a) at least one epoxy monomer comprising two or three epoxy groups, which is not a silicon compound having at least one hydrolyzable group directly linked to the silicon atom, (b) at least one epoxy compound bearing at least one silicon atom having at least one hydrolyzable group directly linked to the silicon atom and at least one group comprising an epoxy function linked to the silicon atom through a carbon atom, and/or a hydrolyzate thereof, (c) at least one epoxy ring-opening catalyst, and
the composition comprises at least 50% by weight of compounds having at least one epoxy group, relative to the total weight of polymerizable compounds present in the composition,
the heat-curable composition provides:
upon heating to a temperature ranging from 60° C. to less than 90° C., a tack-free coating that can be removed by treatment with a 10% wt. solution of sodium hydroxide, and
upon heating to a temperature ranging from 90° C. to 140° C., a coating that cannot be removed by treatment with a 10% wt. solution of sodium hydroxide.

As used herein, when an article comprises one or more layer(s) or coating(s) on the surface thereof, "depositing a layer or a coating onto the article" means that a layer or a coating is deposited onto the uncovered (exposed) surface of the article external coating, that is to say the coating that is the most distant from the substrate.

As used herein, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coating(s) may be interleaved between the substrate/coating and the relevant coating (however, it does preferably contact said substrate/coating), and (iii) does not necessarily completely cover the substrate/coating. When "a coating 1 is said to be located under a coating 2", it should be understood that coating 2 is more distant from the substrate than coating 1.

The optical article according to the invention is preferably a transparent optical article, in particular an optical lens or lens blank, more preferably an ophthalmic lens or lens blank.

The term "ophthalmic lens" is used to mean a lens adapted to a spectacle frame to protect the eye and/or correct the sight. Said lens can be chosen from afocal, unifocal, bifocal, trifocal and progressive lenses. Although ophthalmic optics is a preferred field of the invention, it will be understood that this invention can be applied to optical elements of other types where filtering specified wavelengths may be beneficial, such as, for example, lenses for optical instruments, safety goggles, filters particularly for photography, astronomy or the automobile industry, optical sighting lenses, ocular visors, optics of lighting systems, screens, glazings, etc.

If the optical article is an optical lens, it may be coated on its front main surface, rear main side, or both sides with the coating of the invention. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical article can also be a plano article.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for a stack of one or more functional coatings or layers.

The substrate of the optical article, coated on at least one main face with a coating according to the invention, may be a mineral or an organic glass, for instance an organic glass made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company. Marketed lenses obtained by polymerizing of diethylene glycol bis (allylcarbonate) are referred to as ORMA® lenses from ESSILOR), polycarbonates such as those derived from bisphenol A, (meth)acrylic or thio(meth)acrylic polymers and copolymers such as polymethyl methacrylate (PMMA), urethane and thiourethane polymers and copolymers, epoxy polymers and copolymers, episulfide polymers and copolymers.

Prior to depositing coatings, the surface of the substrate is usually submitted to a physical or chemical surface activating and cleaning treatment, so as to improve the adhesion of the layer to be deposited, such as disclosed in WO 2013/013929.

The optical article comprises a substrate having at least one main surface bearing a coating resulting from the heat-curing of a heat-curable composition according to the invention. Said coating is an epoxy coating, resulting from the polymerization of compounds (a), (b) and optionally (d), which all comprise at least one epoxy group. In the present invention, a coating containing hybrid epoxy copolymers will be generated by using epoxy compounds (a) and optionally (d) according to the invention, devoid of reactive silicon atom, together with organosilanes (b).

The epoxy compounds according to the invention are cyclic ethers and are preferably epoxides (oxiranes). As used herein, the term epoxide represents a subclass of epoxy compounds containing a saturated three-membered cyclic ether. The epoxy groups of compounds (a), (b) and (d) are preferably chosen from glycidyl groups and cycloaliphatic epoxy groups, more preferably from alkyl glycidyl ether groups and cycloaliphatic epoxy groups.

In the present patent application, the term "alkyl" means a linear or branched, saturated or unsaturated monovalent hydrocarbon-based radical, preferably containing from 1 to 25 carbon atoms. The term alkyl includes acyclic groups preferably containing from 1 to 8 carbon atoms, more preferably from 1 to 6 carbon atoms, such as methyl, ethyl, n-propyl, isopropyl, butyl and n-hexyl groups, the cycloaliphatic and cycloalkyl groups preferably containing from 3 to 7 carbon atoms, the cycloalkylmethyl groups preferably containing from 4 to 8 carbon atoms.

In an embodiment, the alkyl group is connected via an sp3 carbon atom and may be substituted with one or more aryl groups and/or may comprise one or more heteroatoms such as N, S, O or an halogen. Examples that can be mentioned include arylalkyl groups such as the trityl group (—CPh3), the benzyl group or the 4-methoxybenzyl group, alkoxyalkyl groups, especially dialkoxymethyl groups such as diethoxymethyl or dimethoxymethyl groups, $CH_2CO_2R^{11}$ groups, in which $R^{11}$ represents an optionally substituted alkyl or aryl group.

The term "cycloalkyl" also includes "heterocycloalkyl" groups, i.e. non-aromatic monocyclic or polycyclic rings in which one or more carbon atoms of the ring(s) have been replaced with a heteroatom such as nitrogen, oxygen, phosphorus or sulfur. The heterocycloalkyl group preferably comprises 1 to 4 endocyclic heteroatoms. The heterocycloalkyl groups may be structures containing one or more non-aromatic rings.

The term "cycloaliphatic" denotes a saturated or unsaturated but non aromatic carbocyclic radical comprising one or several optionally fused rings, which may optionally be substituted with one or more of the groups cited above for the aryl group. The term "cycloaliphatic" also includes "heterocycloaliphatic" groups, i.e. non-aromatic monocyclic or polycyclic rings in which one or more carbon atoms of the ring(s) have been replaced with a heteroatom such as nitrogen, oxygen, phosphorus or sulfur. The cycloaliphatic group is preferably a cycloalkyl group.

The term "aryl" denotes an aromatic carbocyclic radical comprising only one ring (for example a phenyl group) or several, optionally fused, rings (for example naphthyl or terphenyl groups), which may optionally be substituted with one or more groups such as, without limitation, alkyl (for example methyl), hydroxyalkyl, aminoalkyl, hydroxyl, thiol, amino, halo (fluoro, bromo, iodo or chloro), nitro, alkylthio, alkoxy (for example methoxy), aryloxy, monoalkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, trifluoromethyl, tetrazolyl, carbamoyl, alkylcarbamoyl or dialkylcarbamoyl groups. Alternatively, two adjacent positions of the aromatic ring may be substituted with a methylenedioxy or ethylenedioxy group.

The term "aryl" also includes "heteroaryl" groups, i.e. aromatic rings in which one or more carbon atoms of the aromatic ring(s) have been replaced with a heteroatom such as nitrogen, oxygen, phosphorus or sulfur.

Compound (a) according to the invention is a bi- or tri-functional epoxy monomer having two or three epoxy groups per molecule, which is not a silicon compound having at least one hydrolyzable group directly linked to the silicon atom. In the present application, Si—O—Si groups are considered as not being hydrolyzable groups. In one embodiment, compound (a) does not comprise any silicon atom. In the present application, oligomers are considered as being monomers.

More preferably, compound (a) according to the invention does not contain other reactive functions than the epoxy group(s), capable of reacting with other polymerizable functions present in the composition and that would be linked to the polymer matrix of the coating. In other words, preferred epoxy compounds are "pure" epoxy compounds.

Compound (a) preferably comprises two or three glycidyl ether groups and/or cycloaliphatic epoxy groups. The glycidyl ether group is preferably an alkyl glycidyl ether group.

Glycidyl ethers are synthetic compounds characterized by the following group in which $R_1$ denotes a monovalent group:

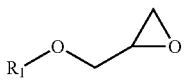

The preferred cycloaliphatic epoxy groups are shown hereunder, in which the hydrogen atoms in the structures may be substituted by one or more substituents such as those cited above as substituents for an aryl group:

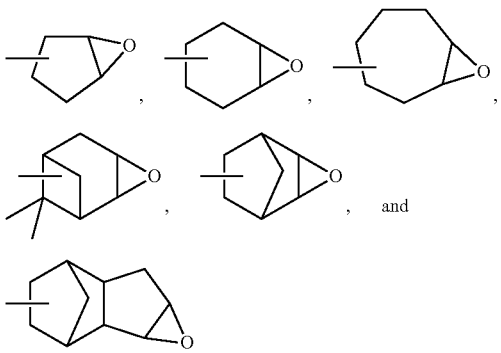

and

In one embodiment, compound (a) comprises a β-(3,4-epoxycyclohexyl)alkyl group such as the β-(3,4-epoxycyclohexyl)methyl and β-(3,4-epoxycyclohexyl)ethyl groups.

Compound (a) can be selected from the group consisting of trimethylolethane triglycidyl ether, trimethylolmethane triglycidyl ether, trimethylolpropane triglycidyl ether (Erisys™ GE-30, from CVC thermoset Specialties), triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether (Epalloy® 5000 from CVC Specialty Chemicals), 3',4'-epoxycyclohexylmethyl-3,4-epoxycyclohexane carboxylate (Uvacure® 1500 from UCB Chemicals, Cyracure® UVR-6110 and UVR® 6105 from Union Carbide), bis (3,4-epoxycyclohexylmethyl) adipate (UVR-6128 from Dow Chemical Company), limonene diepoxide (6-methyl-3-(2-methyloxiran-2-yl)-7-oxabicyclo[4.1.0]heptane, Celloxide 3000 from Daicel Chemical Industries Ltd.), 1,3-bis[2-(3,4-epoxycyclohexyl)ethyl]tetramethyldisiloxane (SIB1092.0 from Gelest, formula Xr), bisphenol A diglycidyl ether resins (n generally ranging from 0 to 25, Epon 828 from Shell Chemical, formula Xb), hexahydrophthalic anhydride diglycidyl ester (CY® 184 from Ciba) and derivatives thereof of formulae Xn and Xo, and mixtures thereof. One can also use Epalloy® 5001 from CVC Specialty Chemicals, which is a faster cure version of Epalloy® 5000 through increased epoxy functionality (two-component mixture, functionality=2.4)

In one embodiment of the invention, the composition further comprises at least one compound (d), which is a polyfunctional epoxy monomer comprising from 4 to 8 epoxy groups (preferably 4 to 6) that is not a silicon compound having at least one hydrolyzable group directly linked to the silicon atom. In one embodiment, compound (d) does not comprise any silicon atom.

More preferably, compound (d) according to the invention does not contain other reactive functions than the epoxy group(s), capable of reacting with other polymerizable functions present in the composition and that would be linked to the polymer matrix of the coating. In other words, preferred epoxy compounds are "pure" epoxy compounds.

Compound (d) preferably comprises 4 to 8 glycidyl ether groups and/or cycloaliphatic epoxy groups. The glycidyl ether group is preferably an alkyl glycidyl ether group.

The preferred cycloaliphatic epoxy groups are the same as those shown for compounds (a). In one embodiment, compound (d) comprises a β-(3,4-epoxycyclohexyl)alkyl group such as the β-(3,4-epoxycyclohexyl)methyl and β-(3,4-epoxycyclohexyl)ethyl groups.

Compound (d) can be selected from the group consisting of diglycerol tetraglycidyl ether, pentaerythritol tetraglycidyl ether, sorbitol hexaglycidyl ether (Erisys™ GE-60, from CVC thermoset Specialties), 1,1,1-tris-(p-hydroxyphenyl) ethane triglycidyl ether (EPALLOY® 9000 from CVC Specialty Chemicals), 1,1,1-tris-(p-hydroxyphenyl) methane triglycidyl ether (Tactix 742 from Ciba), tetrakis (4-hydroxyphenyl) ethane tetraglycidyl ether (Epon 1031 from Shell Chemical, formula Xi), epoxycyclohexyl POSS® Cage Mixture (EP0408 from Hybrid Plastics, having 8 epoxy groups, formula Xd), the 2-(3,4-epoxycyclohexyl)ethyl compound of formula Xs (available from Gelest), and mixtures thereof.

The compounds corresponding to the formulae cited in the above paragraphs are represented hereunder:

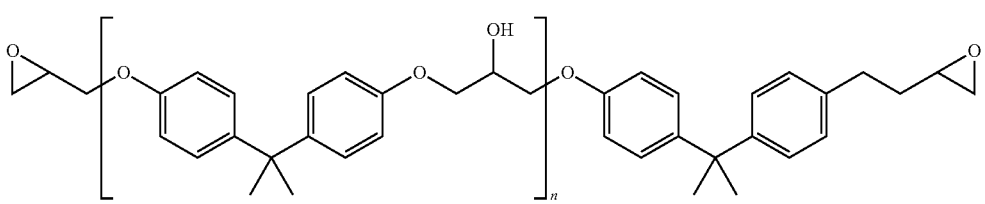

Xb

Xr
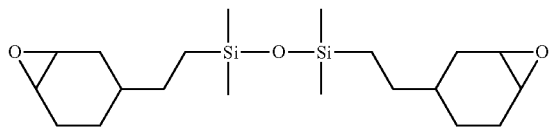

Xd
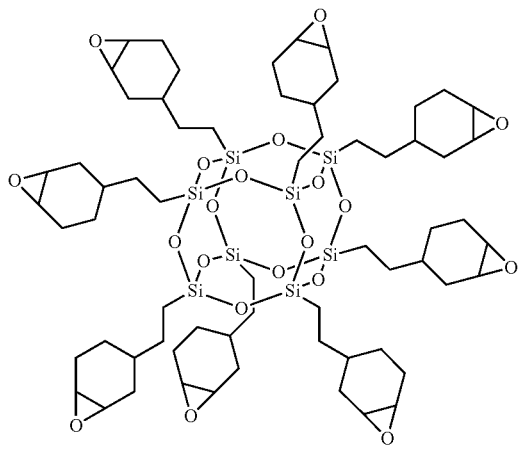

Xi
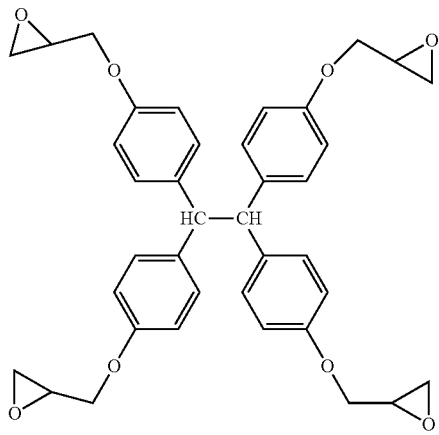

Xs
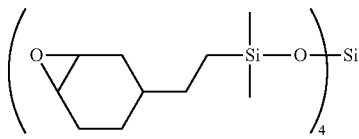

Xn
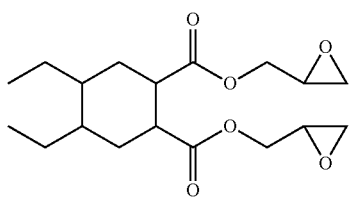

Xo
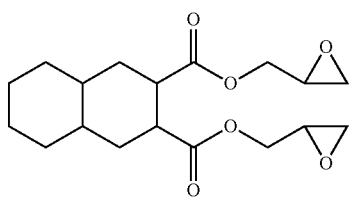

The composition preferably comprises from 10 to 60% by weight of monomers (a) and (d) (if present), more preferably from 15 to 45%, even more preferably from 20 to 35%, relative to the total weight of the composition.

The composition preferably comprises from 10 to 50% by weight of compounds (a), more preferably from 15 to 35%, even more preferably from 20 to 30%, relative to the total weight of the composition.

When compounds (d) are present, they preferably represent from 1 to 10% of the weight of the composition, preferably from 2 to 6% by weight.

The heat-curable composition comprises at least one compound (b), which is an epoxy compound bearing at least one silicon atom having at least one hydrolyzable group directly linked to the silicon atom and at least one group comprising an epoxy function linked to the silicon atom through a carbon atom, and/or a hydrolyzate thereof. Compound (b) preferably has from 2 to 6, more preferably 2 or 3 functional groups generating a silanol group under hydrolysis. Said compound is considered as being an organic compound, and preferably has formula (II):

$$R_{n'}Y_m Si(X)_{4-n'-m} \quad (II)$$

in which the R groups are identical or different and represent monovalent organic groups linked to the silicon atom through a carbon atom and that do not contain any epoxy group, the Y groups are identical or different and represent monovalent organic groups linked to the silicon atom through a carbon atom and containing at least one epoxy group, the X groups are identical or different and represent hydrolyzable groups or hydrogen atoms, m and n' are integers such that m is equal to 1 or 2 and n'+m=1 or 2.

The integers n and m define three groups of compounds II: compounds of formula $RYSi(X)_2$, compounds of formula $Y_2Si(X)_2$, and compounds of formula $YSi(X)_3$. Among these compounds, epoxysilanes having the formula $YSi(X)_3$ are preferred.

The monovalent R groups linked to the silicon atom through a Si—C bond are organic groups. These groups may be, without limitation, hydrocarbon groups, either saturated or unsaturated, preferably $C_1$-$C_{10}$ groups and better $C_1$-$C_4$ groups, for example an alkyl group, preferably a $C_1$-$C_4$ alkyl group such as methyl or ethyl, an aminoalkyl group, an alkenyl group, such as a vinyl group, a $C_6$-$C_{10}$ aryl group, for example an optionally substituted phenyl group, in particular a phenyl group substituted with one or more $C_1$-$C_4$ alkyl groups, a benzyl group, a (meth)acryloxyalkyl group.

The most preferred R groups are alkyl groups, in particular $C_1$-$C_4$ alkyl groups, and ideally methyl groups.

The X groups lead to an OH group upon hydrolysis. It is worth noting that SiOH bonds may be initially present in the compounds of formula II, which are considered in this case as hydrolyzates. Hydrolyzates also encompass siloxane salts.

The X groups may independently and without limitation represent alkoxy groups —O—$R^1$, wherein $R^1$ preferably represents a linear or branched alkyl or alkoxyalkyl group, preferably a $C_1$-$C_4$ alkyl group, acyloxy groups —O—C(O)$R^3$, wherein $R^3$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example the $NHSiMe_3$ group, alkylenoxy groups such as the isopropenoxy group. Hydroxyl groups are considered as being hydrolyzable groups.

Most preferred epoxysilanes are those wherein, in formula II, n'=0, m=1 and X is a C1-C5 alkoxy group, preferably $OCH_3$.

The monovalent Y groups linked to the silicon atom through a Si—C bond are organic groups since they contain at least one epoxy function, preferably one epoxy function. By epoxy function, it is meant a group of atoms, in which an oxygen atom is directly linked to two adjacent carbon atoms or non adjacent carbon atoms comprised in a carbon containing chain or a cyclic carbon containing system. Among epoxy functions, oxirane functions are preferred, i.e. saturated three-membered cyclic ether groups.

The preferred Y groups are groups of formulae III and IV:

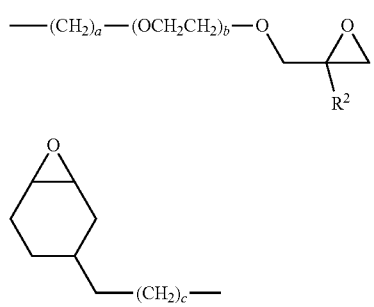

in which $R^2$ is an alkyl group, preferably a methyl group, or a hydrogen atom, ideally a hydrogen atom, a and c are integers ranging from 1 to 6, and b is 0, 1 or 2.

The preferred group having formula III is the γ-glycidoxypropyl group ($R^2$=H, a=3, b=0) and the preferred (3,4-epoxycyclohexyl)alkyl group of formula IV is the β-(3,4-epoxycyclohexyl)ethyl group (c=1). The γ-glycidoxyethoxypropyl group may also be employed ($R^2$=H, a=3, b=1).

Preferred epoxysilanes of formula II are epoxyalkoxysilanes, and most preferred are those having one Y group and three alkoxy X groups. Particularly preferred epoxytrialkoxysilanes are those of formulae V and VI:

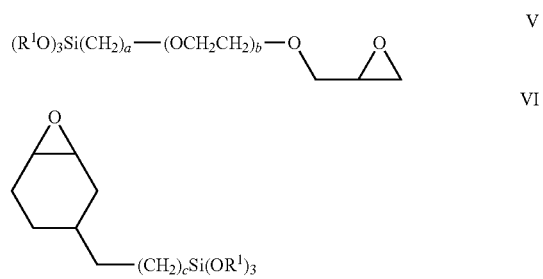

in which $R^1$ is an alkyl group having 1 to 6 carbon atoms, preferably a methyl or ethyl group, and a, b and c are such as defined above.

Examples of such epoxysilanes include but are not limited to γ-glycidoxymethyl trimethoxysilane, γ-glycidoxymethyl triethoxysilane, γ-glycidoxymethyl tripropoxysilane, γ-glycidoxyethyl trimethoxysilane, γ-glycidoxyethyl triethoxysilane, γ-glycidoxyethyl tripropoxysilane, γ-glycidoxypropyl trimethoxysilane, γ-glycidoxypropyl triethoxysilane, γ-glycidoxypropyl tripropoxysilane, γ-glycidoxypropyl methyldiethoxysilane, 2-(3,4-epoxycyclohexyl) ethyltrimethoxysilane, 2-(3,4-epoxycyclohexyl) ethyltriethoxysilane. Other useful epoxytrialkoxysilanes are described in U.S. Pat. Nos. 4,294,950, 4,211,823, 5,015,523, EP 0614957, US 2009/0311518, US 2011/0058142 (compounds of formulae I, VII and VIII) and WO 94/10230. Among those silanes, γ-glycidoxypropyltrimethoxysilane (GLYMO) is preferred.

According to one aspect of this invention, hydrolysis-polymerizable compound (b) is generally hydrolyzed before being mixed to the other components of the composition. The hydrolysis may be performed as known in the art, by using acidic catalysts (such as hydrochloric acid, acetic acid . . . ), in the presence of water.

The composition preferably comprises from 1 to 30% by weight of compounds (b), more preferably from 2 to 25%, even more preferably from 4 to 20%, relative to the total weight of the composition.

Despite the epoxysilane is generally under hydrolyzed form, the amount of epoxysilane will be conventionally defined as the weight of the initial precursor before its hydrolysis. Hydrolysis of alkoxy groups liberates the associated alcohol to form silanol groups which will condense spontaneously. Preferably, the alkoxysilane is reacted with a stoichiometric amount of water to hydrolyze the hydrolyzable groups, typically the alkoxy groups.

In some aspects of the invention, the composition comprises 25 to 60% by weight relative to the total weight of the composition of compounds (a), (d) (if present) and (b), more preferably from 30 to 55% by weight. The dry extract weight of those epoxy compounds preferably represents at least 50% of the dry extract weight of the composition, preferably at least 60%, at least 70%, at least 80%, at least 85%, at least 90%, at least 92% or at least 95% of the dry extract weight of the composition.

In an embodiment, the composition is such that the ratio: dry extract weight of monomers (a) and (d) (if present)/dry extract weight of compounds (b) ranges from 97/3 to 50/50, more preferably from 96/4 to 60/40.

In another embodiment, the composition is such that the weight ratio: monomers (a)/monomers (d) ranges from 100/0 to 50/50, more preferably from 100/0 to 75/25, even more preferably from 95/5 to 80/20.

It is also possible to add to the composition low amounts of additional polymerizable epoxy compounds that are not epoxy compounds (a), (b) or (d) according to the invention, typically less than 20% by weight relative to the total weight of the composition, more preferably less than 15% by weight. This amount can be less than 10% or less than 5% by weight and even 0%. Their dry extract weight preferably represents less than 30% of the dry extract weight of the composition, more preferably less than 20%, 15%, 10%, 5%. This amount can also be 0%. Examples of such compounds are mono-oxetane compounds such as 3-ethyl-3-hydroxymethyloxetane, which can be added to improve the resistance of the coating to removal by a 10% wt. solution of sodium hydroxide after post-cure at 90-140° C.

The heat-curable composition comprises at least 50%, preferably at least 60%, more preferably at least 75, 80, 85, 90, 95 or 100% by weight of compounds having at least one epoxy group (preferably compounds (a), (b) and (d), when present), relative to the total weight of polymerizable compounds (or epoxy compounds) present in the composition.

The heat-curable composition according to the invention preferably comprises less than 25% by weight relative to the total weight of the composition, more preferably less than 20% by weight, of acrylic and/or methacrylic monomers, and more preferably of non-epoxy containing monomers. This amount can be less than 10% or less than 5% by weight and even 0%. In other words, in an embodiment, the composition is devoid of any non epoxy functional monomers.

The dry extract weight of acrylic and/or methacrylic monomers preferably represents less than 30% of the dry extract weight of the composition, more preferably less than 25%, 20%, 10%, 5%. This amount can also be 0%. These amounts also preferably apply to non-epoxy containing monomers.

The dry extract weight can be calculated as a theoretical dry extract weight as disclosed in US 2012/0295084 or EP614957.

The dry extract weight can also be experimentally obtained. The dry extract of a compound or composition is the total weight of the compound or composition after the full removal of volatile solvent(s) at 100° C. to 110° C. in an oven. The dry extract is also called solids content, percent nonvolatile material by weight or % NVM. Traditional procedures to determine solids take 60 min at 105° C. to 110° C. in an oven, and require both pre- and post weighing of the sample pan and sample (ASTM designations: D2369 and D2926-80). The new procedures using the commercial Mark 3 solids analyzer purchased from Sartorius, or SMART Turbo™ purchased from CEM, take only 2 to 10 minutes, depending on the volatile/moisture content and viscosity of the material.

According to the invention, the heat-curable composition provides:
  upon heating to a temperature higher than ambient temperature and less than 90° C., especially at a temperature ranging from 60° C. to less than 90° C. (pre-curing), a tack-free coating that can be removed by treatment with a 10% wt. solution of sodium hydroxide, and
  upon heating to a temperature ranging from 90° C. to 140° C. (post-curing or final curing), a coating that cannot be removed by treatment with a 10% wt. solution of sodium hydroxide.

The first characteristic is satisfied when at least 50% (preferably at least 75% and better 100%) of the surface of the coating is removed after a treatment (soaking) with 10% wt. NaOH at 60° C., and a treatment time of preferably not more than 8 minutes, preferably under ultrasonication.

The area where the coating is removed can be determined by visual inspection at the naked eye. Generally, when the coating is present, the lens surface in reflection under visible light appears uniform and glossy compared to the area of the surface where the coating is removed. The presence of the coating can be also detected or verified by any spectrophotometer method to verify the original coating thickness due to the difference in refractive indices. A Filmetric apparatus F20 can be used.

The second characteristic is satisfied when less than 10%, preferably 0% of the surface of the coating is removed after a treatment (soaking) with 10% wt. NaOH at 60° C., and a treatment time of at least 4 minutes, generally from 4 to 12 minutes, preferably from 4 to 8 minutes, preferably under ultrasonication.

In the present application, pre-curing (partially curing) means curing to a temperature ranging from 60° C. to less than 90° C., which leads to a tack-free coating (to the touch), while post-curing means curing to a temperature ranging from 90° C. to 140° C. so as to obtain a higher level of curing, preferably a completely cured coating.

The man skilled in the art can select the respective amounts and nature of compounds (a), (b) and (d) (when present) allowing to meet the requirements of being removable after pre-curing to a tack-free state and not being removable after post-curing at 90-140° C., by treatment with a 10% wt. solution of sodium hydroxide. This second characteristic ensures that the coating will not be removed during application of subsequent coatings in a production environment.

According to the invention, it has been found that cycloaliphatic epoxy compounds, such as those having a 3,4-epoxycyclohexyl group, are faster curing compounds than glycidyl ether epoxy compounds, providing coatings that are more difficult to remove from the surface of a support such as a lens surface at a given pre-cure time and temperature. In other words, glycidyl ether epoxy compounds require either a higher temperature or longer time to cure (to a tack-free state or to a completely cured state), as compared to cycloaliphatic epoxy compounds.

Compounds (a) provide coatings having a lower cross-link density than highly functionalized compounds (d) after a final post-cure, and are therefore easier to remove. Thus, higher amounts of compounds (d) can improve mechanical properties of a matrix such as abrasion and/or scratch resistance, and resistance to removal by a 10% wt. solution of sodium hydroxide (caustic resistance).

It has been found that compounds (b) provide coatings that can be pre-cured to a tack-free state at relatively low temperatures and can fairly easily be removed from a substrate using a 10% wt. solution of sodium hydroxide. Thus, it is desirable to maximize the content of compounds (b) to improve the stripping ability after pre-cure, but excessive amounts of compounds (b) should preferably be avoided as they may lead to coatings that are undesirably removable by a 10% wt. solution of sodium hydroxide after post-curing at 90-140° C. (after prolonged exposure or even within the normal exposure time of 4 minutes).

It is also desirable to maximize the concentration of epoxy compounds that have the least likelihood of curing during pre-cure (for improved stripping ability after pre-cure) and that are most difficult to remove after post-cure, such as compounds (d) (especially those having glycidyl ether groups) and compounds (a) having glycidyl ether groups, in order to be able to use a maximized amount of compounds (b). On the contrary, the presence of cycloaliphatic epoxy compounds (a) should be minimized.

The compositions of the present invention advantageously further contain small amounts, preferably from 0.005 to 1% by weight, based on the total weight of the composition, of at least one surface active compound (surfactant), more preferably from 0.02 to 0.5%, still more preferably from 0.025 to 0.3%. The surfactant is important for good wetting of the substrate resulting in satisfactory cosmetics of the final coating. Said surfactant can include for example poly(alkylene glycol)-modified polydimethylsiloxanes or polyheptamethylsiloxanes, or fluorocarbon-modified polysiloxanes. Preferred surfactants are fluorinated surfactant such as Novec® FC-4434 from 3M (non ionic surfactant comprising fluoroaliphatic polymeric esters), Unidyne™ NS-9013, and EFKA® 3034 from CIBA (fluorocarbon-modified polysiloxane).

The epoxy compounds of the composition are submitted to a polycondensation and/or cross-linking reaction in the presence of an epoxy ring-opening catalyst (compound (c)). Preferred catalysts found to be able to cure the epoxy composition at temperatures low enough (preferably ≤110° C., more preferably ≤100° C.) not to damage the underlying substrate or cause adverse affects to other coatings or coating components includes (strong) acid catalysts, ammonium salts of metal anions and aluminium-based compounds, designed for ring opening polymerization of cyclic ether groups.

In order to obtain storage-stable heat curable compositions, the catalyst should not catalyze the epoxy ring-opening at room temperature, to prevent premature polymerization or formation of pre-polymers in the coating compositions with time during storage or while in production, thus extending the pot-life and shelf-life thereof without evolution of performance with time. In this regard, the catalyst is preferably a blocked catalyst or a latent catalyst (such as a buffered acid catalyst), blocked catalyst being preferred as latent catalysts may still react at ambient temperature and cause the composition to slightly evolve with time. Blocked catalysts will not react until reaching their respective de-blocking temperatures. The preferred catalysts are inactive at ambient temperature (20° C.) and activated to catalyze epoxy ring-opening only upon heating, generally to 70-80° C. or more.

Exemplary blocked or latent catalysts are based on trifluoromethanesulfonic acid (triflic acid), dinonylnaphthalene sulfonic acid, dinonylnaphthalene disulfonic acid (DNNDSA), and ammonium antimony hexafluoride (a Lewis acid), and are available from King Industries for example Nacure® Super A233 (diethylamine salt of trifluoromethanesulfonic acid), Nacure® 155 (a blocked acid catalyst based on DNNDSA), Nacure® Super XC-7231 (now sold under the name K-Pure® CXC 1612, blocked ammonium antimony hexafluoride catalysts), and Nacure® Super XC-A218 (25% solids) (now sold under the name K-Pure® CXC-1613), metal salt of triflic acid, Lewis acid, buffered to reduce its reactivity at ambient temperature), the latter being one of the preferred catalysts. Other useful catalysts include carboxylic acid anhydrides such as hexahydrophthalic anhydride, methylhexahydrophthalic anhydride, or Lewis acid catalysts including $BF_3$ and $BCl_3$ amine complexes.

In another embodiment, catalyst (c) is chosen from aluminium chelates, aluminium acylates and aluminium alcoholates. The composition does preferably not contain other epoxy ring-opening catalysts such as acid catalysts or ammonium salts of metal anions when those aluminium compounds are employed.

Without wishing to be bound by any theory, it is believed that aluminium based catalysts, in particular aluminium chelates, are the catalysts that are the most efficient to pre-cure a coating composition containing epoxysilanes and epoxy compounds that are not hydrolysis-polymerizable silicon compounds to a tack-free state by curing the epoxysilanes without significantly curing the epoxy compounds that are not hydrolysis-polymerizable silicon compounds until a final post-cure, leading to coatings meeting the removability requirements of the invention. More precisely and without wishing to be bound by any theory, the aluminium based catalyst might promote at low temperature (<80° C.) the condensation reaction of the silanol groups of the alkoxysilane. The coating compositions can be cured to a tack-free state without significantly opening the epoxy groups and without curing the epoxy compounds and especially without curing the epoxy compounds that are not hydrolysis-polymerizable silicon compounds, leading to easily removable coatings (since the latter compounds are those that may cause a difficulty of stripping after pre-cure), while the final post-cure makes the coating non-strippable by curing all epoxy compounds, enabling the optical article to be further coated without any risk of stripping.

Further, aluminum based catalysts cure the present compositions at lower temperatures and in shorter time than the other catalysts cited above (pre-curing and post-curing).

Aluminum acylates and aluminium alcoholates are of preferred general formulae $Al(OC(O)R)_n(OR')_{3-n}$ and $Al(OSiR''_3)_n(OR')_{3-n}$ wherein R and R' are linear or branched chain alkyl groups containing from 1 to 10 carbon atoms, R" is a linear or branched chain, alkyl group containing from 1 to 10 carbon atoms, a phenyl moiety, an acylate moiety of formula OC(O)R, wherein R is as defined just hereabove, and n is an integer from 1 to 3. Preferably, R' is an isopropyl or ethyl group, R and R" are methyl groups.

Aluminium chelates may be formed by reacting an aluminium alcoholate or acylate with chelating agents free from nitrogen or sulfur, comprising oxygen as a coordinating atom, for example acetylacetone, ethyl acetoacetate or diethyl malonate. They may be chosen from aluminium acetylacetonate noted $Al(AcAc)_3$, ethyl mono(acetoacetate) aluminium bisacetylacetonate, ethyl bis(acetoacetate) aluminium monoacetyl acetonate, di-n-butoxy aluminium ethyl mono(acetoacetate) and di-i-propoxy aluminium ethyl mono (acetoacetate). Other examples of such compounds are given in the patent EP 0614957. When the epoxy ring-opening catalyst is an aluminium chelate, the coating composition preferably comprises an organic solvent which boiling temperature at the atmospheric pressure does range from 70 to 140° C., for example ethanol, isopropanol, ethyl acetate, methylethylketone or tetrahydropyrane.

The catalyst is generally used in amounts ranging from 0.01-5% by weight based on the weight of the composition, preferably from 0.1 to 3.5% by weight, more preferably from 0.2 to 3% by weight.

The composition according to the invention generally contains 25-75% by weight of solids (dry extract weight relative to the weight of the composition), preferably from 35 to 55%.

The composition generally contains at least one solvent, which is preferably a glycol monoether. The glycol monoether solvent generally exhibits low surface tensions and is preferably selected from alkylene glycol C1-4 alkyl monoethers, more preferably from ethylene glycol C1-4 alkyl monoethers, propylene glycol C1-4 alkyl monoethers, diethylene glycol C1-4 alkyl monoethers, triethylene glycol C1-4 alkyl monoethers, propylene glycol C1-4 alkyl monoethers, dipropylene glycol C1-4 alkyl monoethers, triethylene glycol C1-4 alkyl monoethers, and tripropylene glycol C1-4 alkyl monoethers. The most preferred glycol monoether is propylene glycol methyl ether. Such a compound is sold commercially by Dow Chemical under the name Dowanol PM® as a mixture of 1-methoxy-2-propanol (major isomer) and 2-methoxy-1-propanol. Additional or alternative solvents can be used, such as alkanols (methanol, ethanol, propanol . . . ), ketones, propylene carbonate or water.

The total amount of solvent depends on the resins used, on the type of optical article and on the coating process. The purpose of the solvent is to achieve good surface wetting and a specific coating viscosity range determined by the coating equipment used to achieve a specific coating thickness range. The solvent typically represents from 25 to 75% of the weight of the composition, preferably from 35 to 65%, more preferably from 40 to 60%.

In one embodiment of the invention, the composition comprises from 30 to 55% by weight relative to the total weight of the composition of monomers (a), (d) (if present) and compounds (b) and from 35 to 65% by weight of at least one organic solvent selected from glycol monoethers, relative to the total weight of the composition.

The composition can also include at least one compound, or a hydrolyzate thereof, of formula $M(Z)_y$, wherein M represents a metal or a metalloid, preferably Si, the Z groups, being the same or different, are hydrolyzable groups and y, equal to or higher than 4, is the metal or metalloid M valence. Such compounds are described in detail in US 2011/0058142. The preferred compounds are compounds of formula $Si(Z)_4$, wherein the Z groups, being the same or different, are hydrolyzable groups, such as tetraethoxysilane.

According to the invention, the coating composition can comprise at least one absorbing dye (pigment or colorant) that at least partially inhibits transmission of light in a selected wavelength range within the visible light range (380-780 nm), and optionally at least one color balancing agent and/or optical brightener in order to at least partially offset the color imparted by the dye. In an embodiment, the selected spectral range within the 380-780 nm region of the electromagnetic spectrum is 400 nm to 500 nm, i.e., the blue wavelength range, more preferably the 415-455 nm range or the 420-450 nm range.

More details concerning this embodiment, such as the arrangement of the color-balancing component relative to the system blocking blue light wavelengths, and exemplary systems including a blue blocking component and a color-balancing component can be found e.g. in U.S. Pat. No. 8,360,574, WO 2007/146933, WO 2015/097186 and WO 2015/097492.

The amount of dye used in the present invention is an amount sufficient to provide a satisfactory inhibition of light within the 380-780 nm wavelength range. For example the dye can be used at a level of 0.005 to 0.50% or 0.01 to 0.2% based on the weight of the coating composition, depending on the strength of the dye and the amount of inhibition/protection desired. It should be understood that the invention is not limited to these ranges, which are only given by way of example.

The composition can further include fillers such as oxides of metals or metalloids, for example silica, preferably used under a colloidal form, and various additives such as curing/cross-linking agents (e.g. silane coupling agents or co-monomers such as polyamines, polythiols, polyols, polycarboxylic acids), rheology modifiers, flow and leveling additives, wetting agents, antifoaming agents, stabilizers, UV absorbers and free radical scavengers (such as hindered amine light stabilizers and antioxidants). The composition can be a solution or a dispersion.

The invention also relates to a process to manufacture an optical article such as herein described, comprising:
(i) depositing on at least one main surface of the substrate of the optical article a heat-curable composition according to the invention,
(ii) heating the optical article coated with said heat-curable composition to a temperature higher than or equal to 60° C. so as to form a tack-free coating,
(iii) heating the optical article coated with said tack-free coating to a temperature higher than or equal to the temperature of step (ii) so as to obtain a completely cured coating.

The epoxy coating of the invention is formed on the substrate of the optical article and can be in direct contact with said substrate. In another embodiment, at least one coating is interleaved between the substrate and the present epoxy coating.

The deposition is preferably carried out by spin coating or dip coating, and more preferably by dip coating. The excellent storage stability and good viscosity performance of the heat curable compositions allow coating of optical articles by simply dipping them into a bath containing the heat-curable composition.

Curing the heat-curable composition is generally performed in two steps, a first pre-curing step to a temperature of at least 60° C., preferably at least 70° C., more preferably at least 75° C., typically from 75° C. to 100° C. or from 80° C. to 100° C., for at least 5 minutes, generally from 10 to 25 or 30 minutes, typically 15 minutes, so as to form a tack-free coating, and a second step of heating the optical article coated with the tack-free coating to a temperature higher than or equal to the temperature of the pre-curing step, preferably at least 90° C. or 95° C., more preferably at least 98° C. or 100° C., typically from 100 to 140° C., preferably from 100 to 115° C., for 1 to 3 hours, generally at least two hours, preferably for 2.5 to 3.5 hours, typically 3 hours, so as to obtain a completely cured insoluble coating. The process leads to transparent clear coatings with low haze.

The temperature of the first curing step depends on the catalyst used, which is typically a blocked catalyst (60-100° C., preferably 80-100° C.). Higher temperatures reduce the pre-cure time. The preferred temperature of pre-curing step (ii) is 75° C. or 80° C. In case the catalyst activation temperature is higher than 80° C., the optical article must be heated to a higher temperature. The heating temperature of the second curing step preferably does generally not exceed 115° C. Higher temperatures could be harmful to the substrate. The preferred temperature of step (iii) is 100° C. or 110° C.

The thickness of the cured coating may be adapted to the specific application required and generally ranges from 0.5 to 50 μm, preferably from 1 to 20 μm, more preferably from 2 to 10 μm. The coating thickness can be easily adjusted by modifying the solvent concentration of the claimed compositions and the coating conditions, for example the withdrawal speed in case of deposition by dip coating. The longer the withdrawal time, the thinner will be the final dry coating.

The substrate's main surface can be coated with several functional coating(s) to improve its optical and/or mechanical properties. The term "coating" is understood to mean any layer, layer stack or film which may be in contact with the substrate and/or with another coating, for example a sol-gel coating or a coating made of an organic resin. A coating may be deposited or formed through various methods, including wet processing, gaseous processing, and film transfer. The functional coatings used herein can be selected from, without limitation to these coatings, an impact-resistant coating, an abrasion-resistant and/or scratch-resistant coating, an antireflection coating, a polarized coating, a photochromic coating, an antistatic coating, an antifouling coating (hydrophobic and/or oleophobic coating), an antifog coating, a precursor of an antifog coating or a stack made of two or more such coatings.

The primer coatings improving the impact resistance and/or the adhesion of the further layers in the end product are preferably polyurethane latexes or acrylic latexes. Primer coatings and abrasion-resistant and/or scratch-resistant coatings may be selected from those described in the application WO 2007/088312.

Abrasion- and/or scratch-resistant coatings (hard coatings) are preferably hard coatings based on poly(meth) acrylates or silanes. Recommended hard abrasion- and/or scratch-resistant coatings in the present invention include coatings obtained from silane hydrolyzate-based compositions (sol-gel process), in particular epoxysilane hydrolyzate-based compositions such as those described in the US patent application US 2003/0165698 and in U.S. Pat. No. 4,211,823 and EP614957.

The antireflection coating may be any antireflection coating traditionally used in the optics field, particularly ophthalmic optics. As is also well known, antireflection coatings traditionally comprise a monolayered or a multilayered stack composed of dielectric materials (generally one or more metal oxides) and/or sol-gel materials and/or organic/inorganic layers such as disclosed in WO 2013/098531. These are preferably multilayered coatings, comprising layers with a high refractive index (HI) and layers with a low refractive index (LI).

The structure and preparation of antireflection coatings are described in more details in patent application WO 2010/109154, WO 2011/080472 and WO 2012/153072.

The antifouling top coat is preferably deposited onto the outer layer of the antireflective coating. As a rule, its thickness is lower than or equal to 10 nm, does preferably range from 1 to 10 nm, more preferably from 1 to 5 nm. Antifouling top coats are generally coatings of the fluorosilane or fluorosilazane type, preferably comprising fluoropolyether moieties and more preferably perfluoropolyether moieties. More detailed information on these coatings is disclosed in WO 2012076714.

Coatings such as primers, hard coats, antireflection coatings and antifouling coatings may be deposited using methods known in the art, including spin-coating, dip-coating, spray-coating, evaporation under vacuum, sputtering, chemical vapor deposition and lamination.

In an embodiment, the process comprises forming on the substrate the epoxy coating according to the invention, an impact-resistant coating, an abrasion-resistant and/or scratch-resistant coating, and optionally an antireflection coating and an antifouling coating. The epoxy coating can also be applied in different coating configurations to maintain or improve general coating performances while still showing low haze and good adhesion, such as forming on the substrate a polyurethane reactive hot-melt adhesive, the epoxy coating according to the invention, an impact-resistant coating and an abrasion-resistant and/or scratch-resistant coating. In one embodiment, the present epoxy coating is interleaved between an impact-resistant coating and an abrasion-resistant and/or scratch-resistant coating.

As the present epoxy coating provides caustic resistance, it can also be used as an external layer deposited directly onto the substrate or functional coatings. In another embodiment, it is used as a protective coating to protect against scratches or similar cosmetic defects resulting from physical handling an underlying layer or substrate such as a photochromic layer, as disclosed in WO 2011/075128 or U.S. Pat. No. 6,268,055.

The coatings are preferably directly deposited on one another. These coatings can be deposited one by one, or a stack of one or more coatings can be formed on the substrate, for example by lamination.

In one embodiment, the present optical article is prepared by forming on the substrate the epoxy coating in a first manufacturing site, while the other coatings are formed in a second manufacturing site.

The optical article according to the invention preferably has a relative light transmission factor in the visible spectrum Tv higher than or equal to 85 or 87%, preferably higher than or equal to 90%, more preferably higher than or equal to 92%, and better higher than or equal to 95%. Said Tv factor preferably ranges from 87% to 98.5%, more preferably from 88% to 97%, even better from 90% to 96%. The Tv factor, also called "luminous transmission" of the system, is such as defined in the standard NF EN 1836 and relates to an average in the 380-780 nm wavelength range that is weighted according to the sensitivity of the eye at each wavelength of the range and measured under D65 illumination conditions (daylight).

The following examples illustrate the present invention in a more detailed, but non-limiting manner. Unless stated otherwise, all thicknesses disclosed in the present application relate to physical thicknesses. The percentages given in the tables are weight percentages. Unless otherwise specified, the refractive indexes referred to in the present invention are expressed at 25° C. at a wavelength of 550 nm.

EXAMPLES

The optical articles used in the examples comprise an ORMA® lens substrate from ESSILOR, having a 65 mm diameter, a refractive index of 1.50, a power of −2.00 diopters and a thickness of 1.2 mm.

Various coating compositions of epoxy copolymers were prepared and are shown in the tables below. The compositions comprise at least one non silicon-containing bi- or tri-functional epoxy monomer comprising two or three epoxy groups (compound (a)), γ-glycidoxypropyltrimethoxysilane (from Evonik Industries) or 3-glycidoxypropyl methyldiethoxysilane (KBE-402® from Shin-Etsu Silicone), as compound (b) pre-hydrolyzed with 0.10 N HCl, a Lewis acid polymerization catalyst for the epoxy groups (compound (c): Nacure® Super XC-A218, metal salt of triflic acid in n-butanol, 25% wt., from King Industries or Nacure® Super XC-7231, ammonium hexafluoroantimonate from King Industries), a surfactant (EFKA® 3034, which is a fluorocarbon containing organically modified polysiloxane, 50-53% wt. in methoxypropanol, sold by CIBA, or Novec® FC-4434, which is a non ionic surfactant comprising fluoroaliphatic polymeric esters, 25% wt. in dipropylene glycol monomethyl ether, sold by 3M), propylene glycol methyl ether (Dowanol® PM from Dow Chemical Company) and optionally propylene carbonate as a solvent.

The following non silicon-containing bi- or tri-functional epoxy monomers comprising two or three epoxy groups were investigated (compounds (a)): Erisys™ GE-30 (trimethylolpropane triglycidyl ether, abbreviated as GE-30, from CVC thermoset Specialties) and UVACure® 1500 (3',4'-epoxycyclohexylmethyl-3,4-epoxycyclohexanecarboxylate, cycloaliphatic diepoxy compound from Allnex USA Inc.).

The following non silicon-containing polyfunctional epoxy monomer comprising from 4 to 8 epoxy groups was used in some examples (compound (d)): Erisys™ GE-60 (sorbitol hexaglycidyl ether, abbreviated as GE-60, from CVC thermoset Specialties).

Other optional compounds can be included in some compositions, such as colloidal silica (MA-ST-HV® from Nissan Chemical, 30% wt. dispersion in methanol, example 20), and dyes.

The structures of some of the various epoxy compounds that have been used are recalled hereunder:

tance was measured by means of the sand Bayer test, in accordance with the ASTM F735-81 standard. Haze was measured on a Haze-Gard XL-211 Plus apparatus from BYK-Gardner in accordance with the standard ASTM D1003-00. As haze is a measurement of the percentage of transmitted light scattered more than 2.5° from the axis of the incident light, the smaller the haze value, the lower the degree of cloudiness. Generally, for optical articles described herein, a haze value of less than or equal to 0.3% is acceptable, more preferably of less than or equal to 0.2%.

c) The light transmission factor in the visible spectrum Tv was measured in transmission mode (incidence angle: 0°) from a wearer's view angle using a Cary 4000 spectrophotometer from Hunter, with the back (concave) side of the lens (2 mm thickness at the center) facing the detector and

| Epoxy compound | Glymo | KBE-402 ® | Erisys ™ GE-30 |
|---|---|---|---|
| Structure | | | |

| Epoxy compound | Erisys ™ GE-60 | UVACure ® 1500 |
|---|---|---|
| Structure | | |

Evaluation of the Coating Performances a) A dry adhesion test, referred to as a crosshatch tape peel adhesion test, was performed on coated articles in accordance with IS™ 02-010, using 3M SCOTCH® n° 600 transparent tape, such as disclosed in U.S. Pat. No. 7,476,415 and US 20140037964, after they have been subjected to a Q-Sun test. The Q-sun test consists in introducing the prepared lenses in a Q-SUN® Xe-3 xenon chamber, reproducing full spectrum sunlight, purchased from Q-LAB, at a relative humidity of 20% (±5%) and at a temperature of 23° C. (±5° C.), and exposing their convex side to the light for 40 h or 80 h.

b) Abrasion resistance and haze were determined as disclosed in WO 2012/173596. Specifically, abrasion resislight incoming on the front side of the lens. Tv was measured under D65 illumination conditions (daylight).

Preparation, Deposition and Curing of the Coating Compositions

Epoxy compounds (a) and (d) (when present) were mixed in a Nalgene container. The solvent (Dowanol® PM) was added and the solution was allowed to stir for 60 minutes. The surfactant was added and the mixture allowed to mix for 60 more minutes.

Compound (b), typically glymo, was mixed with 0.1N HCl for 0.5-1 hrs, and then added to the other ingredients. An ultrasonication or agitation process was sometimes added to obtain more uniform solutions.

In the coatings utilizing the blocked and buffered catalysts from King Industries, the catalyst was added after mixing the epoxies, solvent and optional dyes together and before adding the hydrolyzed Glymo. In the coatings utilizing Al(AcAc)₃, the catalyst was added last (after adding the hydrolyzed Glymo to the epoxy/solvent/dye mixture).

Each of the coating solutions was deposited by spin coating onto a cleaned face of an Orma® lens previously cleaned with diluted NaOH (500 rpm for 5 s, then 1000 rpm for 10 s, all examples except examples 6 and C1, C2), or by dip coating both faces of such lens in the coating composition (at a withdrawal speed of 2.5 mm/s, examples 6 and C1, C2). A pre-curing step at 75-80° C. generally for 15 minutes followed by a post-curing step at 100-110° C. for 3 hours were then performed. The (dry) coating thicknesses were ~5 μm (examples 6, C1, C2) or ~8 μm (in the other examples).

The results are shown in the tables below.

| Example | | 1 | 2 | 3 | 4 | 5 |
|---|---|---|---|---|---|---|
| Epoxy compound | (d)GE-60 (%) | 2.38 | 2.72 | 2.89 | 3.06 | 3.23 |
| | (a)GE-30 (%) | 4.83 | 5.52 | 5.865 | 6.21 | 6.555 |
| | (a) UVACure® 1500 (%) | 19.67 | 22.48 | 23.885 | 25.29 | 26.695 |
| | (b)Glymo (%) | 24.41 | 16.28 | 12.21 | 8.14 | 4.07 |
| (c)Nacure® Super XC-A218 (%) | | 3.85 | 4.4 | 4.675 | 4.95 | 5.225 |
| EFKA® 3034 (%) | | 0.07 | 0.08 | 0.085 | 0.09 | 0.095 |
| Dowanol® PM (%) | | 39.2 | 44.8 | 47.6 | 50.4 | 53.2 |
| HCl 0.1N (%) | | 5.59 | 3.72 | 2.79 | 1.86 | 0.93 |
| After heating 15 min at 80° C. | | Tack-free Removable by 10% NaOH (8 min at 60° C.) | Tack-free Removable by 10% NaOH (8 min at 60° C.) | Tack-free Removable by 10% NaOH (8 min at 60° C.) | Tack-free Mostly removable by 10% NaOH (8 min at 60° C.) | Tack-free Mostly removable by 10% NaOH (8 min at 60° C.) |
| After heating 3 hours at 110° C. | | Non-removable by 10% NaOH (8 min at 60° C.) | Non-removable by 10% NaOH (8 min at 60° C.) | Non-removable by 10% NaOH (8 min at 60° C.) | Non-removable by 10% NaOH (8 min at 60° C.) | Non-removable by 10% NaOH (8 min at 60° C.) |

| Example | | 6 | 7 | 8 | C1 (comparative) | C2 (comparative) |
|---|---|---|---|---|---|---|
| Epoxy compounds | (d)GE-60 (%) | 2.41 | 2.35 | 2.29 | 30.6 | 3.4 |
| | (a)GE-30 (%) | 4.89 | 4.77 | 4.66 | 7.1 | 6.9 |
| | (a)UVACure® 1500 (%) | 19.90 | 19.42 | 18.96 | 0 | 28.1 |
| | (b)Glymo (%) | 10.19 | 11.94 | 13.60 | 0 | 0 |
| (c)Nacure® Super XC-A218 (%) | | 3.90 | 3.80 | 3.71 | 5.7 | 5.5 |
| EFKA® 3034 (%) | | 0.07 | 0.07 | 0.07 | 0.1 | 0.1 |
| Dowanol® PM (%) | | 56.33 | 54.96 | 53.65 | 56.6 | 56.0 |
| HCl 0.1N (%) | | 2.30 | 2.69 | 3.07 | 0 | 0 |
| After heating 15 min at 75° C. (80° C. for examples C1, C2) | | Tack-free Removable by 10% NaOH (4 min at 60° C.) | Tack-free Removable by 10% NaOH (4 min at 60° C.) | Tack-free Removable by 10% NaOH (4 min at 60° C.) | Tack-free Non-removable by 10% NaOH (30 min at 60° C.) | Tack-free Non-removable by 10% NaOH (30 min at 60° C.) |
| After heating 3 hours at 110° C. (100° C. for examples C1, C2) | | Non-removable by 10% NaOH (8 min at 60° C.) | Non-removable by 10% NaOH (4 min at 60° C.) | Non-removable by 10% NaOH (4 min at 60° C.) | Non-removable by 10% NaOH (30 min at 60° C.) | Non-removable by 10% NaOH (30 min at 60° C.) |

| Example | | 9 | 10 | 11 | 12 | 13 |
|---|---|---|---|---|---|---|
| Epoxy compounds | (d)GE-60 (%) | 2.53 | 2.52 | 2.50 | 2.50 | 2.49 |
| | (a)GE-30 (%) | 5.13 | 5.11 | 5.08 | 5.07 | 5.05 |
| | (a)UVACure® 1500 (%) | 20.87 | 20.81 | 20.68 | 20.62 | 20.56 |

-continued

| Example | | 9 | 10 | 11 | 12 | 13 |
|---|---|---|---|---|---|---|
| (b)Glymo (%) | | 5.26 | 5.49 | 5.96 | 6.18 | 6.41 |
| (c)Nacure ® Super XC-7231 (%) | | 5.85 | 5.83 | 5.79 | 5.77 | 5.76 |
| EFKA ® 3034 (%) | | 0.07 | 0.07 | 0.07 | 0.07 | 0.07 |
| Dowanol ® PM (%) | | 59.09 | 58.90 | 58.55 | 58.37 | 58.19 |
| HCl 0.1N (%) | | 1.20 | 1.26 | 1.36 | 1.42 | 1.47 |
| After heating 15 min at 75° C. | | Tack-free Removable by 10% NaOH (8 min at 60° C.) | Tack-free Removable by 10% NaOH (8 min at 60° C.) | Tack-free Removable by 10% NaOH (8 min at 60° C.) | Tack-free Removable by 10% NaOH (8 min at 60° C.) | Tack-free Removable by 10% NaOH (8 min at 60° C.) |
| After heating 3 hours at 100° C. | | Non-removable by 10% NaOH (8 min at 60° C.) | Non-removable by 10% NaOH (8 min at 60° C.) | Non-removable by 10% NaOH (8 min at 60° C.) | Non-removable by 10% NaOH (4 min at 60° C.) | Non-removable by 10% NaOH (4 min at 60° C.) |

| Example | | | 14 | 15 | 16 | 17 | 18 |
|---|---|---|---|---|---|---|---|
| Epoxy compounds | (d)GE-60 (%) | | 2.66 | 2.62 | 2.57 | 2.57 | 2.52 |
| | (a)GE-30 (%) | | 5.39 | 5.32 | 5.22 | 5.21 | 5.12 |
| | (a)UVACure ® 1500 (%) | | 21.94 | 21.64 | 21.25 | 21.20 | 20.83 |
| (b)Glymo (%) | | | 4.88 | 5.92 | 7.27 | 7.24 | 8.55 |
| (c)Nacure ® Super XC-7231 (%) | | | 1.84 | 1.82 | 1.78 | 2.05 | 2.01 |
| EFKA ® 3034 (%) | | | 0.08 | 0.08 | 0.07 | 0.07 | 0.07 |
| Dowanol ® PM (%) | | | 62.10 | 61.26 | 60.16 | 60.00 | 58.95 |
| HCl 0.1N (%) | | | 1.12 | 1.35 | 1.66 | 1.66 | 1.95 |
| After heating 20 min at 80° C. | | | Tack-free Partially removable by 10% NaOH (4 min at 60° C.) | Tack-free Partially removable by 10% NaOH (4 min at 60° C.) | Tack-free Removable by 10% NaOH (8 min at 60° C.) | Tack-free Removable by 10% NaOH (4 min at 60° C.) | Tack-free Removable by 10% NaOH (4 min at 60° C.) |
| After heating 3 hours at 100° C. | | | Non-removable by 10% NaOH (8 min at 60° C.) | Non-removable by 10% NaOH (8 min at 60° C.) | Non-removable by 10% NaOH (8 min at 60° C.) | Non-removable by 10% NaOH (8 min at 60° C.) | Non-removable by 10% NaOH (4 min at 60° C.) |

| Example | | 19 | 20 |
|---|---|---|---|
| Epoxy compounds | (d) GE-60 (%) | 2.42 | 2.55 |
| | (a) GE-30 (%) | 4.90 | 5.18 |
| | (a)UVACure ® 1500 (%) | 19.95 | 21.08 |
| (b)Glymo (%) | | 10.53 | 4.9 |
| (b) KBE-402 ® (%) | | 0 | 2.6 |
| Colloidal silica (%) | | 0 | 15.8 |
| (c) Nacure ®Super XC-A218 (%) | | 0.32 | 4.13 |
| (c) Nacure ® Super XC-7231 (%) | | 2.77 | 0 |
| EFKA ® 3034 (%) | | 0 | 0.08 |
| Novec ® FC-4434 (%) | | 0.19 | 0 |
| Dowanol ® PM (%) | | 56.45 | 42 |
| HCl 0.1N (%) | | 2.41 | 1.7 |
| After heating 15 min at 75° C. (80° C. for example 19) | | Tack-free Removable by 10% NaOH (8 min at 60° C.) | Tack-free Removable by 10% NaOH (4 min at 60° C.) |
| After heating 3 hours at 110° C. (100° C. for example 19) | | Non-removable by 10% NaOH (4 min at 60° C., 3 times) | Non-removable by 10% NaOH (4 min at 60° C.) |

| Example | | 21 | 22 | 23 | 24 | 25 |
|---|---|---|---|---|---|---|
| Epoxy compounds | (d)GE-60 (%) | 2.50 | 4.00 | 5.00 | 6.00 | 0 |
| | (a)GE-30 (%) | 5.00 | 8.00 | 10.00 | 12.00 | 15.09 |
| | (a)UVACure ® 1500 (%) | 20.00 | 15.50 | 12.50 | 9.50 | 10.48 |

-continued

| Example | 21 | 22 | 23 | 24 | 25 |
|---|---|---|---|---|---|
| (b)Glymo (%) | 10.58 | 10.58 | 10.58 | 10.58 | 10.36 |
| (c)Nacure ® Super XC-7231 (%) | 2.70 | 2.70 | 2.70 | 2.70 | 0 |
| (c)Al(AcAc)₃ (%) | 0 | 0 | 0 | 0 | 0.47 |
| Novec ® FC-4434 (%) | 0.20 | 0.20 | 0.20 | 0.20 | 0.20 |
| Dowanol ® PM (%) | 51.20 | 51.20 | 51.20 | 51.20 | 56.87 |
| Propylene carbonate (%) | 5.40 | 5.40 | 5.40 | 5.40 | 0 |
| Methanol (%) | 0 | 0 | 0 | 0 | 4.17 |
| HCl 0.1N (%) | 2.42 | 2.42 | 2.42 | 2.42 | 2.37 |
| Heating time at 90° C. (75° C. for example 25) required to tack-free state | 18 min | 22 min | 23 min | 25 min | 8 min |
| After heating 3 hours at 100° C. | Non-removable by 10% NaOH (4 min at 60° C., 1 time) | Non-removable by 10% NaOH (4 min at 60° C., 3 times) | Non-removable by 10% NaOH (4 min at 60° C., 3 times) | Non-removable by 10% NaOH (4 min at 60° C., 3 times) | Non-removable by 10% NaOH (4 min at 60° C., 2 times) |

| Example | | 26 | 27 | C3 (comparative) | C4 (comparative) | C5 (comparative) |
|---|---|---|---|---|---|---|
| Epoxy compounds | (a)UVACure ® 1500 (%) | 30.73 | 29.89 | 29.10 | 28.35 | 27.50 |
| | (b)Glymo (%) | 2.27 | 4.42 | 6.46 | 8.39 | 10.58 |
| (c)Nacure ® Super XC-7231 (%) | | 3.02 | 2.94 | 2.86 | 2.78 | 2.70 |
| Novec ® FC-4434 (%) | | 0.22 | 0.22 | 0.21 | 0.21 | 0.20 |
| Dowanol ® PM (%) | | 57.21 | 55.65 | 54.18 | 52.78 | 51.20 |
| Propylene carbonate (%) | | 6.03 | 5.90 | 5.71 | 5.57 | 5.40 |
| HCl 0.1N (%) | | 0.52 | 1.01 | 1.48 | 1.92 | 2.42 |
| After heating 15 min at 90° C. | | Tack-free | Tack-free | Tack-free | Tack-free | Tack-free |
| After heating 3 hours at 100° C. | | Non-removable by 10% NaOH (4 min at 60° C., 3 times) | Non-removable by 10% NaOH (4 min at 60° C., 2 times) | Partially removable by 10% NaOH (4 min at 60° C., 1 time): 60% of the surface is removed | Partially removable by 10% NaOH (4 min at 60° C., 1 time): 80% of the surface is removed | Removable by 10% NaOH (4 min at 60° C. 1 time) |

After pre-curing at 75-90° C. for 15 min, the coatings according to the invention were tack-free and removable (strippable) from the lenses, generally totally removable, after soaking in a soda solution (NaOH, 10 wt. %) under ultrasonication at 60° C. for 4 or 8 minutes (ultrasonication was used for each removal treatment with NaOH, such as the ultrasonication provided by a D645 dip coating machine).

After post-curing at 100-110° C. for 3 hrs, the coatings exhibited low haze (~0.1%), good transmittance (Tv-92%), good adhesion after 80 h Q-sun exposure and/or caustic treatment and good abrasion resistance (Sand Bayer values for examples C2, 6 and 20 were respectively 0.8, 1,13 and 1.3).

The post-cured coatings were caustic resistant, which means that they could not be removed from the lenses after cleaning in a soda solution (NaOH, 10 wt. %) under ultrasonication at 60° C. for at least 4 minutes.

A comparison of examples 1-8 with examples C1 and C2 reveals that the presence in the composition of an organic silicon compound having at least one hydrolyzable group directly linked to the silicon atom and at least one epoxy group (compound (b)) allows to obtain a coating that is removable after a treatment with 10% NaOH at 60° C., preferably with a treatment time of not more than 8 minutes. The coatings in examples C1 and C2 were caustic resistant after pre-curing since they could not be removed by 10% NaOH, even after an extended treatment of 30 min at 60° C.

The examples show that the epoxy coating compositions can be cured by using various catalysts. The amount of hydrolyzed epoxy-silane needed to maintain caustic resistance after post-cure with the ability to strip the coating after pre-cure is dependent on the catalyst nature and concentration.

Adding a small amount of the latent catalyst Nacure® Super XC-A218 to the blocked catalyst Nacure® Super XC-7231 (such as in example 19) allowed improved processing time and composition stability over a composition containing exclusively the blocked catalyst, for thicker optical articles (data not shown). The latent catalyst allowed the coating to pre-cure at a lower temperature and in a shorter time, while the blocked catalyst reacted well at the higher post-cure temperature. Using only the minimum amount of the latent catalyst ensured the longest stability and pot-life of the coating composition.

A comparison of examples 9-13 on one hand and examples 14-18 on the other hand shows that by increasing the pre-cure temperature from 75° C. to 80° C. and time from 15 to 20 minutes, the amount of catalyst needed to obtain a tack-free coating was divided by more than 2, which significantly reduces the coating production costs.

It was found that other epoxy silanes with or without colloidal silica could be added while retaining the removability characteristics, low haze, good transmittance, good adhesion and improved abrasion resistance (example 20).

A coating composition using exclusively a metal chelate catalyst, Al(AcAc)$_3$, was able to be quickly pre-cured at low temperature to a tack-free state (example 25, 8 min at 75° C.) and the coating to be stripped in as little as 8 minutes with 10% wt. NaOH at 60° C.

As seen in examples 21 through 24, increasing the glycidyl ether epoxy concentrations (GE-30 and GE-60), while decreasing the cycloaliphatic epoxy concentration (UVA-Cure® 1500), increased the pre-cure time needed to obtain a tack-free state. By removing the glycidyl ether containing epoxy compounds, it was possible to reduce the pre-cure time needed to obtain a tack-free state to 15 minutes at 90° C. (examples 26, 27). The amount of hydrolyzed epoxysilane needed for stripping after pre-cure could be dramatically reduced while maintaining caustic resistance after post-curing.

Comparative examples C3-C5 show that a composition containing a too high amount of compound (b) leads to a coating that can be partially or totally removed by a 10% wt. solution of sodium hydroxide after post-cure.

The above examples correspond to epoxy coatings directly deposited onto a lens, without surrounding coatings (configuration 1: lens/epoxy coating).

Other coating configurations were also tested to show that the present epoxy coatings can be used as intermediate functional layers in different coating configurations and maintain or improve general coating performances such as mechanical performances:

Configuration 2: lens/epoxy coating/primer coating/hard coat.

Configuration 3: lens/polyurethane reactive coating/epoxy coating/primer coating/hard coat.

Reference configuration: lens/primer coating/hard coat.

The epoxy coating used to compare the different configuration was that of example 6. The primer (polyurethane) and hard coat (polysiloxane) were those used in the examples of WO 2013/013929. The polyurethane reactive coating was that used in the examples of U.S. Pat. No. 6,187,444 and WO 2011/075128, with or without photochromic dyes.

| Configuration | Reference | 2 | 3 |
|---|---|---|---|
| ASTM haze (%) | 0.1 | 0.1 | 0.1 |
| Adhesion after Q-sun 80 h | Good | Good | Good |
| Sand Bayer | 3.1 | 3.5-3.7 | 4.1 |

The invention claimed is:

1. A heat-curable composition comprising:
  (a) at least one epoxy monomer having two or three epoxy groups, which is not a silicon compound having at least one hydrolyzable group directly linked to the silicon atom;
  (b) at least one epoxy compound bearing at least one silicon atom having at least one hydrolyzable group directly linked to the silicon atom and at least one group comprising an epoxy function linked to the silicon atom through a carbon atom, and/or a hydrolyzate thereof; and
  (c) at least one epoxy ring-opening catalyst;
wherein:
  the composition comprises at least 50% by weight of at least one compound having at least one epoxy group, relative to the total weight of polymerizable compounds present in the composition; and
  the heat-curable composition provides:
    upon heating to a temperature ranging from 60° C. to less than 90° C., a tack-free coating that can be removed by treatment with a 10% wt. solution of sodium hydroxide; and
    upon heating to a temperature ranging from 90° C. to 140° C., a coating that cannot be removed by treatment with a 10% wt. solution of sodium hydroxide
  the composition further comprising at least one organic solvent selected from glycol monoethers,
    the ratio: dry extract weight of monomers (a) and (d) (if present)/dry extract weight of compound (b) ranges from 97/3 to 50/50, where a monomer (d) is an epoxy monomer comprising from 4 to 8 epoxy groups that is not a silicon compound having at least one hydrolyzable group directly linked to the silicon atom; and
  wherein the composition comprises from 30 to 55% by weight relative to the total weight of the composition of monomers (a), (d) (if present) and compound (b) and from 35 to 65% by weight of at least one organic solvent selected from glycol monoethers, relative to the total weight of the composition.

2. The composition of claim 1, wherein the composition comprises at least 60% by weight of at least one compound having at least one epoxy group, relative to the total weight of polymerizable compounds present in the composition.

3. The composition of claim 1, wherein the composition comprises at least 75% by weight of at least one compound having at least one epoxy group, relative to the total weight of polymerizable compounds present in the composition.

4. The composition of claim 1, wherein the composition is devoid of any non-epoxy functional monomers.

5. The composition of claim 1, wherein the weight ratio: monomers (a)/monomers (d) ranges from 100/0 to 50/50, where a monomer (d) is an epoxy monomer comprising from 4 to 8 epoxy groups that is not a silicon compound having at least one hydrolyzable group directly linked to the silicon atom.

6. The composition of claim 1, wherein the epoxy groups of monomer (a) and compound (b) are chosen from glycidyl groups and cycloaliphatic epoxy groups.

7. The composition of claim 1, wherein compound (b) is a compound of formula:

$$R_{n'}Y_mSi(X)_{4-n'-m} \quad \text{(II)}$$

in which the R groups are identical or different and represent monovalent organic groups linked to the silicon atom through a carbon atom and that do not contain any epoxy group, the Y groups are identical or different and represent monovalent organic groups linked to the silicon atom through a carbon atom and contain at least one epoxy group, the X groups are identical or different and represent hydrolyzable groups or hydrogen atoms, m and n' are integers such that m is equal to 1 or 2 and n'+m=1 or 2.

8. The composition of claim 1, comprising from 1 to 30% by weight of compound (b) relative to the total weight of the composition.

9. The composition of claim 1, comprising monomer (d).

10. An optical article comprising a substrate having at least one main surface bearing a coating resulting from the heat-curing of a heat-curable composition of claim 1.

11. The optical article of claim 10, further defined as an optical lens.

12. The optical article of claim 10, further defined as an ophthalmic lens.

13. A method for preparing the optical article of claim 10, comprising:
   (i) depositing on the substrate of the optical article a heat-curable composition of claim 1;
   (ii) heating the optical article coated with said heat-curable composition to a temperature higher than or equal to 60° C. so as to form a tack-free coating; and
   (iii) heating the optical article coated with said tack-free coating to a temperature higher than or equal to the temperature of step (ii) so as to obtain a completely cured coating.

14. The composition of claim 1, wherein compounds (d) represent from 1 to 10% of the weight of the composition.

15. The composition of claim 1, wherein the ratio: dry extract weight of monomers (a) and (d) (if present)/dry extract weight of compound (b) ranges from 96/4 to 60/40, where a monomer (d) is an epoxy monomer comprising from 4 to 8 epoxy groups that is not a silicon compound having at least one hydrolyzable group directly linked to the silicon atom.

16. A heat-curable composition comprising:
   (a) at least one epoxy monomer having two or three epoxy groups, which is not a silicon compound having at least one hydrolyzable group directly linked to the silicon atom;
   (b) at least one epoxy compound bearing at least one silicon atom having at least one hydrolyzable group directly linked to the silicon atom and at least one group comprising an epoxy function linked to the silicon atom through a carbon atom, and/or a hydrolyzate thereof;
   (c) at least one epoxy ring-opening catalyst; and
   (d) at least one epoxy monomer comprising from 4 to 8 epoxy groups that is not a silicon compound having at least one hydrolyzable group directly linked to the silicon atom;
   wherein:
      the composition comprises at least 50% by weight of at least one compound having at least one epoxy group, relative to the total weight of polymerizable compounds present in the composition; and
      the heat-curable composition provides:
         upon heating to a temperature ranging from 60° C. to less than 90° C., a tack-free coating that can be removed by treatment with a 10% wt. solution of sodium hydroxide; and
         upon heating to a temperature ranging from 90° C. to 140° C., a coating that cannot be removed by treatment with a 10% wt. solution of sodium hydroxide
      the composition further comprising at least one organic solvent selected from glycol monoethers,
         the ratio: dry extract weight of monomers (a) and (d)/dry extract weight of compound (b) ranges from 97/3 to 50/50.

17. The composition of claim 1, wherein compound (d) represents from 2 to 6% of the weight of the composition.

* * * * *